United States Patent
Takeuchi et al.

(10) Patent No.: US 7,434,849 B2
(45) Date of Patent: Oct. 14, 2008

(54) PIPE JOINT FOR REFRIGERATION CYCLE

(75) Inventors: Masayuki Takeuchi, Nukata-gun (JP); Yoshitaka Tomatsu, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/895,751

(22) Filed: Jul. 21, 2004

(65) Prior Publication Data
US 2005/0023828 A1 Feb. 3, 2005

(30) Foreign Application Priority Data
Jul. 22, 2003 (JP) ............................. 2003-277480

(51) Int. Cl.
F16L 17/00 (2006.01)
(52) U.S. Cl. .................. 285/347; 285/918; 285/205
(58) Field of Classification Search ............. 285/142.1, 285/141.1, 918, 910, 347, 368, 205–208, 285/124.2, 124.3, 124.4, 351
See application file for complete search history.

(56) References Cited

U.S. PATENT DOCUMENTS

| | | | |
|---|---|---|---|
| 6,206,432 B1 | 3/2001 | Kamiyama | |
| 6,260,851 B1 * | 7/2001 | Baron | 285/918 |
| 6,273,478 B1 * | 8/2001 | Benett et al. | 285/346 |
| 6,328,351 B1 | 12/2001 | Kato et al. | |
| 6,443,502 B1 * | 9/2002 | Iida et al. | 285/351 |
| 6,454,314 B1 * | 9/2002 | Grosspietsch et al. | 285/319 |

FOREIGN PATENT DOCUMENTS

| | | |
|---|---|---|
| JP | 63-006291 | 1/1988 |
| JP | 3-69894 | 3/1991 |
| JP | 7-145888 | 6/1995 |
| JP | 7-217779 | 8/1995 |
| JP | 11-218283 | 8/1999 |
| JP | 2000-46259 | 2/2000 |
| JP | 2001-173855 | 6/2001 |
| JP | 2002-5296 | 1/2002 |

* cited by examiner

Primary Examiner—Aaron M Dunwoody
(74) Attorney, Agent, or Firm—Harness, Dickey & Pierce, PLC

(57) ABSTRACT

The front end portion of a fitting projection from the portion on which a backup ring is mounted to the front end, has a diameter smaller than the inner diameter of the backup ring. The backup ring is endless in the circumferential direction thereof. The backup ring functions as a sealing member.

8 Claims, 8 Drawing Sheets

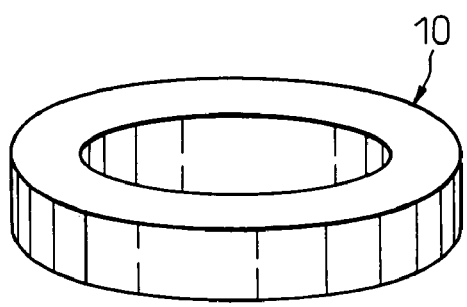
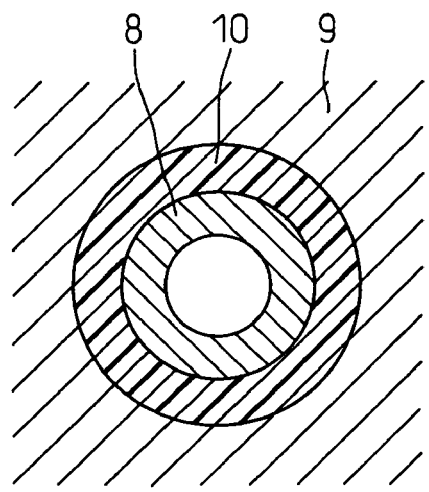
Fig.3A Fig.3B
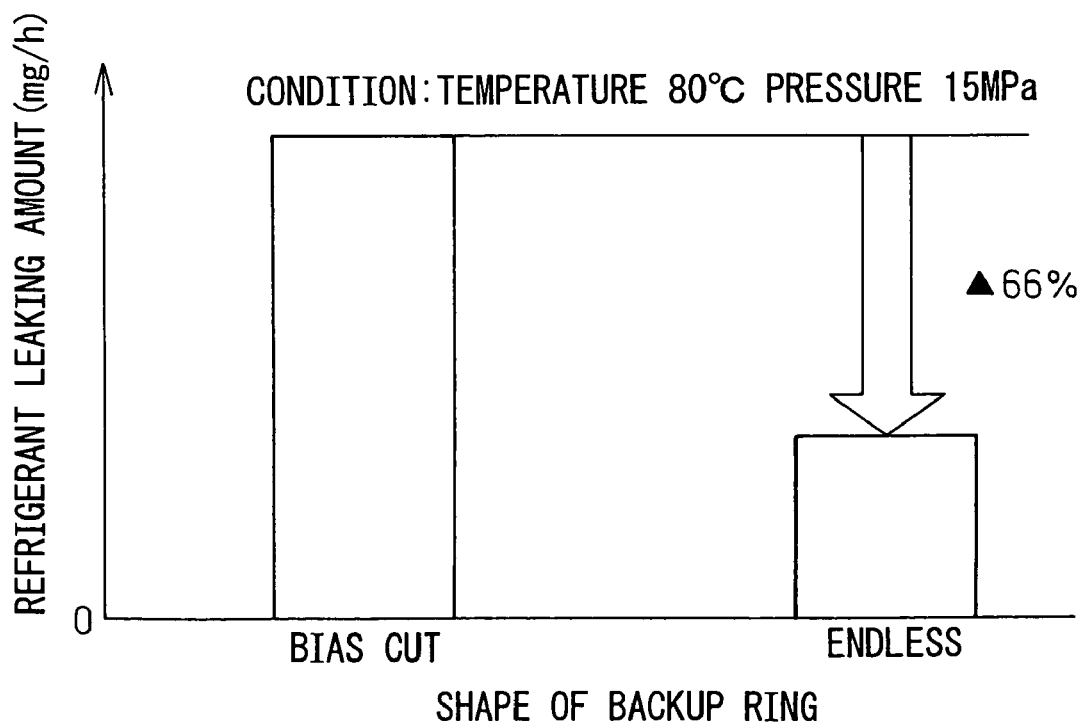
Fig.4

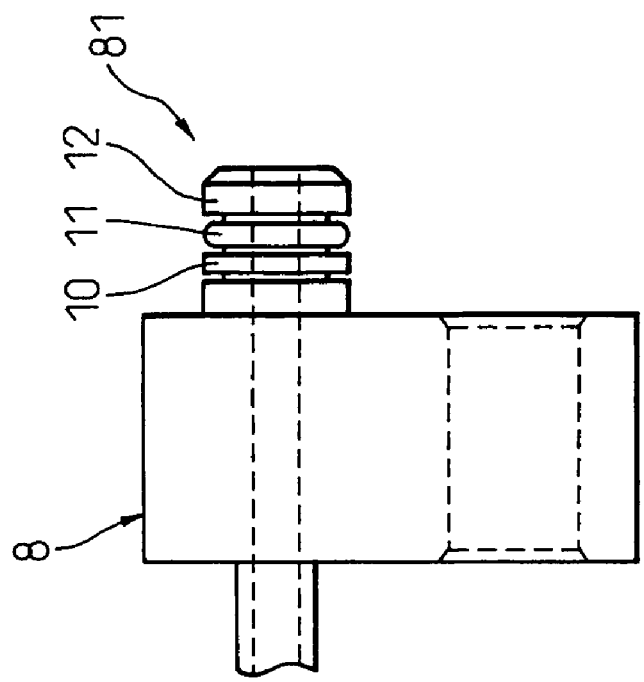
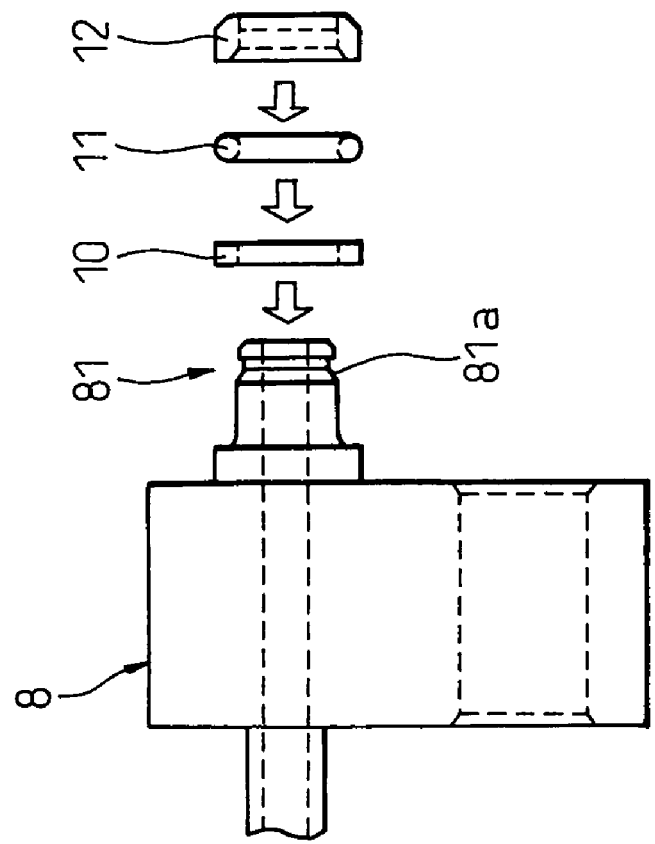

PIPE JOINT FOR REFRIGERATION CYCLE

BACKGROUND OF THE INVENTION

1. Field of the Invention

The present invention relates to a pipe joint for a refrigeration cycle, used for joining refrigerant passages of a refrigeration cycle.

2. Description of the Related Art

Recently, a refrigeration cycle using carbon dioxide ($CO_2$), as a refrigerant, has been developed instead of using chlorofluorocarbons. In the system using the $CO_2$ refrigerant, pipes are used for joining refrigerator devices, and pipe joints are used for joining pipes and refrigerator devices or joining pipes, in a manner similar to a conventional system. The applicant has filed a pipe joint used in a conventional refrigeration cycle apparatus previously.

FIG. 11 is a sectional view of a conventional refrigeration cycle pipe joint 7. As shown in the drawing, the pipe joint 7 is composed of a male joint portion 8 and a female joint portion 9, and has a cylindrical sealing structure in which an O-ring 11 is basically used. A cylindrical fitting projection 81 is formed in the male joint portion 8, and the fitting projection 81 is provided with a rectangular groove 81b. The O-ring 11 is fitted in the rectangular groove 81b.

Because the working pressure of the $CO_2$ refrigerant is high, in order to prevent the o-ring 11 from riding on the fitting projection, a backup ring 10 is provided in the rectangular groove 81b on the side opposite to the pressure receiving surface of the O-ring 11. FIG. 12 is a perspective view of a conventional backup ring 10. The backup-ring 10 is generally made of, resin, or the like, having a ductility less than that of the O-ring 11.

The backup ring 10 cannot be extended, in contrast to the O-ring 11, and, accordingly, is provided with a cut called a bias cut 10a, to be fitted in the rectangular groove 81b beyond a thick portion 81c. FIG. 13A is an explanatory side view of an operation of attaching the backup ring 10 and the O-ring 11 to a conventional male joint portion 8. FIG. 13B is a side view of an assembled male joint portion 8.

A cylindrical fitting recess 91, into which the fitting projection 81, the backup ring 10 and the O-ring 11 are inserted, is formed in the female joint portion 9. The fitting projection 81 is fitted in the fitting recess 91, to join the refrigerant passages, and to prevent the refrigerant from leaking to the outside (to the atmosphere). FIG. 13A is a sectional view of a conventional refrigeration cycle pipe joint 7 in a joined state. FIG. 13B is an enlarged sectional view taken along the line F-F in FIG. 13A. Reference numerals in the drawings, which are not described above, correspond to reference numerals which will be described later in embodiments of the present invention.

However, when the above-described structure of the pipe joint is used in the $CO_2$ refrigerant system, the $CO_2$ refrigerant cannot be sufficiently prevented from leaking, by only the O-ring 11, because a permeability coefficient of the $CO_2$ refrigerant is large and, accordingly, the $CO_2$ refrigerant permeates through a rubber of the o-ring. In addition, the backup ring has the bias cut and, accordingly, an excellent refrigerant sealing property cannot be expected (see FIG. 13B).

SUMMARY OF THE INVENTION

In view of the above conventional problem, the object of the present invention is to provide a pipe joint, for a refrigeration cycle, having an excellent sealing property.

In order to accomplish the above object, technical means according to first to tenth aspects of the present invention are adopted. Namely, in a first aspect, there is provided a pipe joint, for a refrigeration cycle, comprising a male joint portion (8) and a female joint portion (9), for joining refrigerant passages of a refrigeration cycle (R), said male joint portion (8) having a cylindrical fitting projection (81), a backup ring (10) functioning as a pressure receiving member, which is fitted on the fitting projection (81), and an O-ring (11), as a sealing member, which is fitted on the fitting projection and is located adjacent to the backup ring (10) and closer to a front end of the fitting projection than the backup ring, said female joint portion (9) having a cylindrical fitting recess (91) in which the fitting projection (81), the backup ring (10) and the O-ring (11) are fitted, so that when the fitting projection (81) is fitted in the fitting recess (91), the refrigerant passages are joined, and leakage of a refrigerant to the outside is prevented, wherein an end portion of the fitting projection (81) from the portion on which the backup ring (10) is mounted to the front end, has a diameter smaller than the inner diameter of the backup ring (10); and an endless backup ring which continuously extends in a circumferential direction is used as the backup ring (10).

According to the first aspect, a bias cut (10a) of the backup ring (10) is not required when the backup ring (10) is fitted on the fitting projection (81) and, accordingly, the endless backup ring (10) which continuously extends in a circumferential direction can be used. Therefore, the backup ring (10) can also function as a sealing member and, thus, the refrigeration cycle pipe joint having an excellent refrigerant sealing property can be obtained. Consequently, a necessary charging amount of a refrigerant can be reduced because the amount of a refrigerant which permeates to atmosphere is reduced, and the size of a receiver or an accumulator, having a refrigerant storing function, can be reduced.

In a second aspect, the material of the backup ring (10) has a lower refrigerant permeability than that of the material of the O-ring (11). According to the second aspect, the refrigerant sealing property can be enhanced by not only the O-ring (11) but also the backup ring (10) because the material of the backup ring 10 has an extremely small permeability to gas.

In a third aspect, a cap (12), which is located adjacent to the O-ring (11) and closer to the front end of the fitting projection (81) than the O-ring is provided on the front end of the fitting projection; and the female joint portion (9) is provided with a cylindrical fitting recess (91) in which the fitting projection (81), the backup ring (10), the O-ring (11) and the cap (12) are fitted. According to the third aspect, the cap (12) is provided on the front end of the fitting projection and, accordingly, the O-ring (11) and the backup ring (10) can be prevented from being detached.

In a fourth aspect, the cap (12) is detachably attached to the fitting projection (81). According to the forth aspect, O-ring (11) and the backup ring (10) are replaceable.

In a fifth aspect, an insertion preventing projection (12b) is provided on the portion of the cap (12), corresponding to the front end of the fitting projection (81). According to the fifth aspect, the O-ring (11) can be prevented from being pressed by the cap, (12) due to the working pressure of the refrigerant, and from riding on the fitting projection.

In a sixth aspect, a cap holding groove (81a) is provided at the front end portion of the fitting projection (81); and a holding projection (12a) to be fitted in the cap holding groove (81a) is provided in the inner peripheral surface of the cap (12). According to the sixth embodiment, the holding projection (12a) of the cap (12) is fitted in the cap holding groove (81a) and, accordingly, the O-ring (11) can be prevented from being pressed by the cap (12), due to the working pressure of the refrigerant, and from riding on the fitting projection, in a manner similar to the insertion preventing projection (12b) of the fifth aspect.

The cap (12) can be held at a predetermined position of the front end portion of the fitting projection (81) and, accordingly, not only the cap (12) but also the O-ring (11) and the backup ring (10) can be more reliably prevented from being detached.

In a seventh aspect, the insertion preventing projection (12b) and the holding portion (12a) are spaced in a circumferential direction of the cap (12). According to the seventh aspect, the insertion preventing projection (12b) and the holding ribs (12a), which are inwardly projected, do not overlap as viewed in the axial direction of the cap (12) and, accordingly, the cap (12) can be easily formed, using molding dies which are opened in the axial direction thereof.

In an eighth aspect, the material of the cap (12) is softer than that of the male joint portion (9). According to the eighth aspect, the reduction of the sealing property, due to damage, when the male joint portion (8) is fitted in the female joint portion (9) on a sealing surface of the O-ring inside the fitting recess 91 of the female joint portion 9, can be presented.

In a ninth aspect, an elastomer is used as a material of the cap (12). According to the ninth aspect, the cap (12) is made of an elastomer and, accordingly, is soft and can be easily molded. Thus, a high-volume production can be easily carried out, and the cost can be reduced.

In a tenth aspect, the fluid passing through the pipe joint is a carbon dioxide ($CO_2$) refrigerant. According to the tenth aspect, it is preferable that the present invention is applied to a pipe joint for connecting refrigerant passages of a refrigeration cycle using $CO_2$ refrigerant having a high working pressure and a large permeability coefficient.

Incidentally, the reference numerals in parentheses, used to denote the above means, are intended to show the relationship of the specific means which will be described later in an embodiment of the invention.

The present invention may be more fully understood from the description of preferred embodiments of the invention set forth below, together with the accompanying drawings.

BRIEF DESCRIPTION OF THE DRAWINGS

In the drawings:

FIG. 3A is a perspective view of the backup ring 10 in FIG. 2, and FIG. 3B is an enlarged sectional view taken along the line B-B in FIG. 2A;

FIG. 4 is a graph of the effect of the present invention;

FIG. 8A is an explanatory side view of an attaching operation to a male joint portion 8 in FIG. 5, and FIG. 8B is a side view of an assembled male joint portion 8;

DESCRIPTION OF PREFERRED EMBODIMENTS

Figure 1:
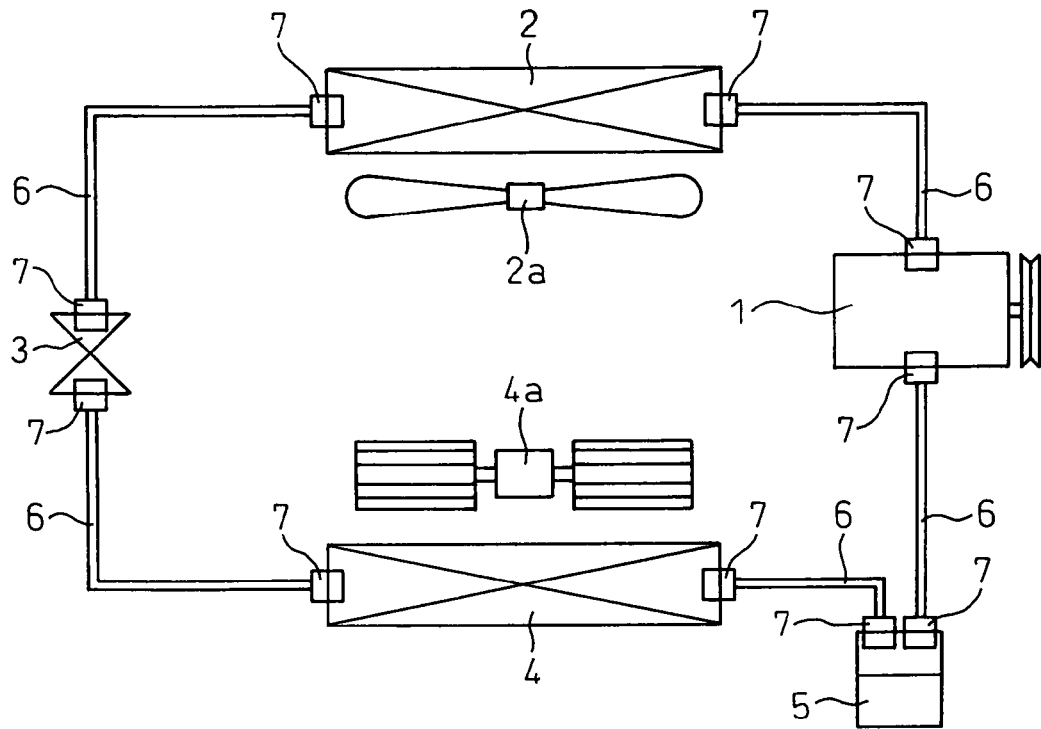
FIG. 1 is a schematic view of an embodiment of a refrigeration cycle R according to the present invention.

Embodiments of the present invention will be described below with reference to the drawings. First, a first embodiment will be described. FIG. 1 is a schematic view of an embodiment of a refrigeration cycle R according to the present invention. The refrigeration cycle R, in which refrigerator devices including a refrigerant compressor 1, a refrigerant condenser 2, an expansion valve 3, a refrigerant evaporator 4, an accumulator 5, etc. are connected in a loop, is well known. Specifically, these devices are connected by refrigerant pipes 6 having pipe joints 7. In FIG. 1, numeral 2a designates an air blower which supplies air for a heat exchange, to the refrigerant condenser 2; and 4a designates an air blower which supplies air for a heat exchange, to the refrigerant evaporator 4.

Figure 2A:
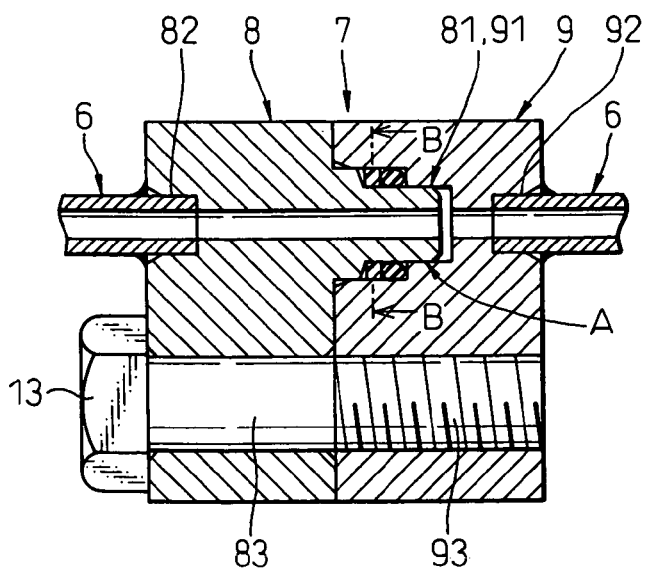
FIG. 2A is a sectional view of a first embodiment of a refrigeration cycle pipe joint 7 in a joined state, according to the present invention.
Figure 2B:
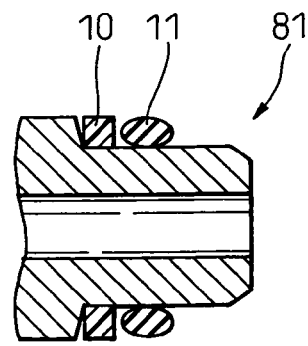
FIG. 2B is an enlarged view of a portion A in FIG. 2A.

FIG. 2A is a sectional view of a first embodiment of a refrigeration cycle pipe joint 7 (hereinafter referred to as "pipe joint 7") in a joined state, according to the present invention. FIG. 2B is an enlarged view of a portion A in FIG. 2A. FIG. 3A is a perspective view of a backup ring 10 in FIG. 2A. FIG. 3B is an enlarged sectional view taken along the line B-B in FIG. 2A. The pipe joint 7 is composed of a male joint portion 8 and a female joint portion 9, and cylindrical refrigerant pipes 6 and connection blocks are brazed to both joints 8, 9.

Here, the refrigerant pipe 6 is usually made of a metal including aluminum, copper, brass, stainless, iron, etc. In the present embodiment, aluminum A3004 (Japanese Industrial Standard, called "JIS") having, on its outer peripheral surface, a covering material A4004 (JIS), as a brazing metal, is used. The connection block is made of materials similar to the refrigerant pipe 6, and aluminum A7000s (JIS) is used in the present embodiment.

The male joint portion 8 comprises a fitting projection 81 formed on one side (on the right side in FIG. 2A), a pipe insertion hole 82 formed on the other side (on the left side in FIG. 2A), a communication hole for communicating the fitting projection 81 to the pipe insertion hole 82, and a threaded hole 83. The fitting projection 81 is formed cylindrically, and an O-ring 11 functioning as a sealing member and the backup ring 10 functioning as a pressure receiving member are fitted on the outer periphery of the projection (see FIG. 2B).

Here, the O-ring 11 is shaped like a doughnut, and has a circular section. The O-ring 11 is made of an elastic material such as rubber or the like, and IIR rubber is used in the present embodiment. As shown in FIG. 3A, the backup ring 10 continuously extends in a circumferential direction thereof, and is made of a material, having a low refrigerant permeability, such as nylon resin or the like. The refrigerant pipe 6 is inserted into the pipe insertion hole 82, and is joined to the same by brazing. The threaded hole 83 penetrates through the end portion of the male joint portion 8, and a bolt 13 is threaded into the threaded hole 83 when the male joint portion 8 is joined to the female joint portion 9.

The female joint portion 9 comprises a fitting recess 91 formed on one side (on the left side in FIG. 2A), a pipe insertion hole 92 formed on the other side (on the right side in FIG. 2A), a communication hole for communicating the fitting recess 91 to the pipe insertion hole 92, and a threaded hole 93. The fitting recess 91 defines a cylindrical hollow portion. The refrigerant pipe 6 is inserted into the pipe insertion hole 92, and is joined to the same by brazing. The threaded hole 93 penetrates through the end portion of the female joint portion 9, and the bolt 13 is threaded into the threaded hole 93 when joining and securing the male joint portion 8 to the female joint portion 9. As shown in FIG. 2A, in the pipe joint 7, the fitting projection 81 of the male joint portion 8 is fitted in the fitting recess 91 of the female joint portion 9, and the bolt 13 is fastened and, thus, the male joint portion 8 is joined and secured to the female joint portion 9.

The operation of the present embodiment will be described. After the refrigerant compressor 1 is activated, a high-temperature and high-pressure refrigerant compressed by the refrigerant compressor 1 is cooled by the refrigerant condenser 2, and is decompressed by the expansion valve 3. The decompressed refrigerant having a low temperature and a low pressure, is evaporated by a heat-exchange between the refrigerant and ambient air and, then, is sucked to the refrigerant compressor 1 via the accumulator 5. These devices are connected, via the refrigerant pipes 6, by pipe joints 7 provided on each device and each end of the refrigerant pipes 6.

The features of the present embodiment will be described. The front end portion of the fitting projection 81 from the portion on which a backup ring 10 is mounted to the front end, has a diameter smaller than the inner diameter of the backup ring 10. The backup ring 10 continuously extends in the circumferential direction thereof.

Accordingly, a bias cut 10a of the backup ring 10 is unnecessary when the backup ring 10 is fitted on the fitting projection 81, and the backup ring 10, which is endless in the circumferential direction thereof, can be used. Therefore, a refrigeration cycle pipe joint having an excellent refrigerant sealing property can be obtained because no leakage occurs at the bias cut and leakage mainly occurs due to refrigerant which permeates through the resin of the ring. Accordingly, the backup ring 10 can serve as a sealing member (see FIG. 3B).

FIG. 4 is a graph of experimental data showing the effect of the present invention. If the endless-type backup ring 10 and the bias cut-type backup ring 10 are made of the same material, the amount of leakage of the refrigerant in the endless-type is reduced by about 66%, in comparison with that of the bias cut-type. This can reduce a necessary charging amount of the refrigerant because the amount of leakage of the refrigerant to the atmosphere is reduced, and also can reduce the size of a receiver and the accumulator in which the refrigerant is stored.

The refrigerant permeability of the material of the backup ring 10 is lower than that of the O-ring 11. Accordingly, the refrigerant sealing property can be enhanced by not only the O-ring 11 but also the backup ring 10 because the material of the backup ring 10 has an extremely small permeability of gas. The fluid passing through the pipe joints 7 is $CO_2$ refrigerant. Accordingly, it is preferable that the present invention is used for pipe joints which connect refrigerant passages of a refrigerant cycle using the $CO_2$ refrigerant having a high working pressure and a large permeability coefficient.

Figure 5A:
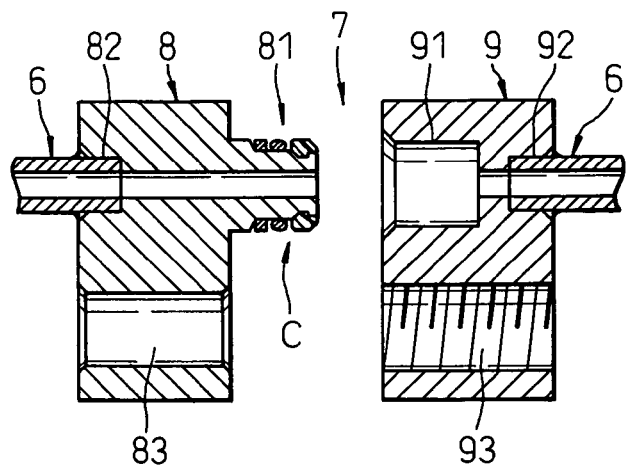
FIG. 5A is a sectional view of a second embodiment of a refrigeration cycle pipe joint 7 according to the present invention.
Figure 5B:
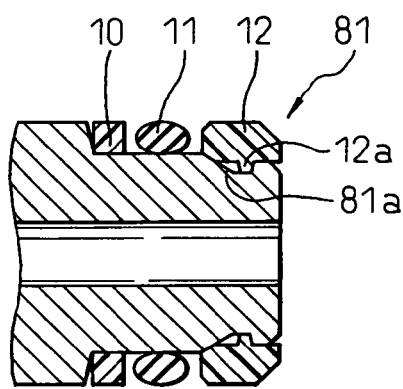
FIG. 5B is an enlarged view of a portion C in FIG. 5A.
Figure 11:
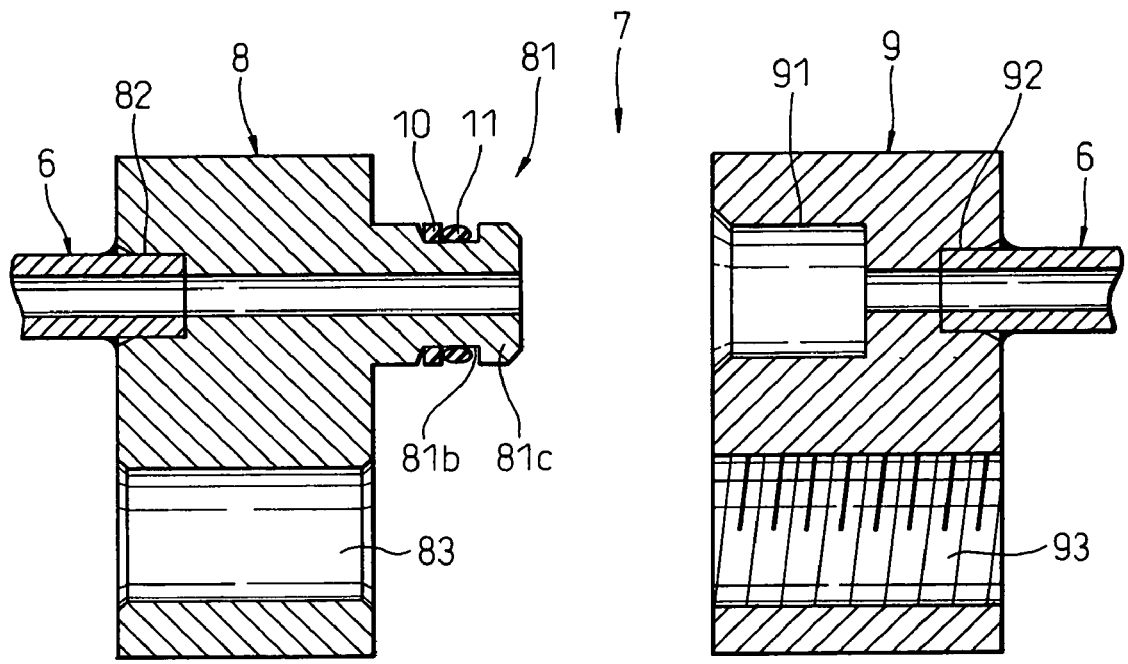
FIG. 11 is a sectional view of a conventional and general refrigeration cycle pipe joint 7 according to the present invention.
Figure 12:
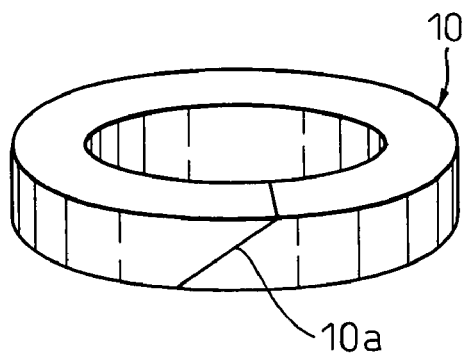
FIG. 12 is a perspective view of a conventional backup ring 10.
Figure 13A:
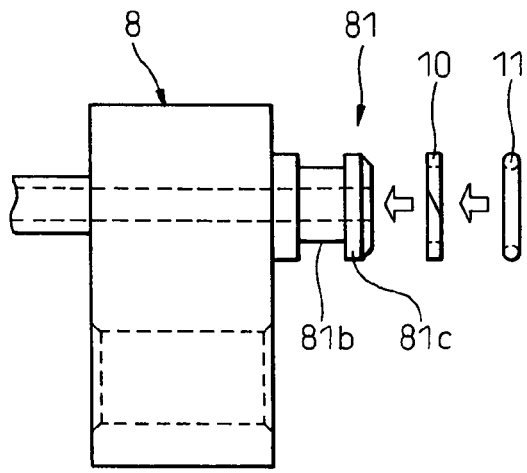
FIG. 13A is an explanatory side view of an attaching operation of a backup ring 10 and an O-ring 11 to a conventional male joint portion 8.
Figure 13B:
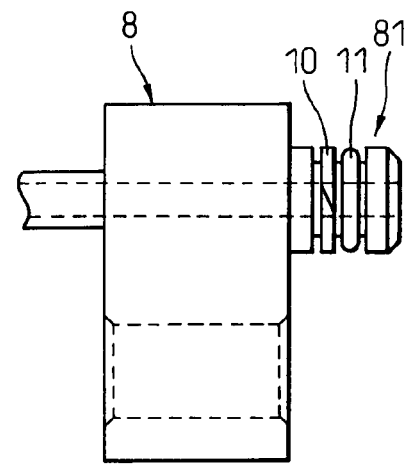
FIG. 13B is a side view of an assembled male joint portion 8.
Figure 14A:
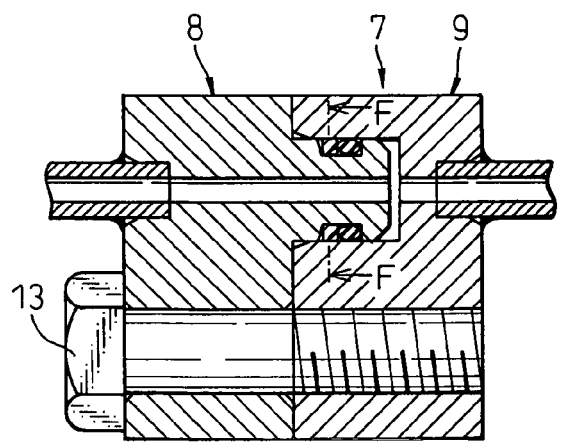
FIG. 14A is a sectional view of a conventional refrigeration cycle pipe joint 7 in a joined state.
Figure 14B:
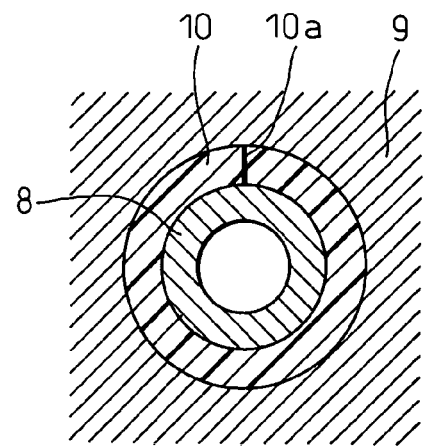
FIG. 14B is an enlarged sectional view taken along the line F-F in FIG. 14A.

A second embodiment will be described. FIG. 5A is a sectional view of a second embodiment of a refrigerant cycle pipe joint 7 according to the present invention. FIG. 5B is an enlarged view of a portion C in FIG. 5A. In contrast to the first embodiment, a cap 12 is detachably provided on the front end of the fitting projection 81 of the male joint portion 8 in place of a conventional thick portion 81c (see FIG. 11). Accordingly, the fitting recess 91 of the female joint portion 9, into which the fitting projection 81, the backup ring 10, the O-ring 11 and the cap 12 are inserted, is shaped cylindrically. The material of the cap 12 is softer than that of the female joint portion 9. In the present embodiment, the cap 12 is made of an elastomer, PBT (polybutadiene terephthalate), and is molded.

Figure 6:
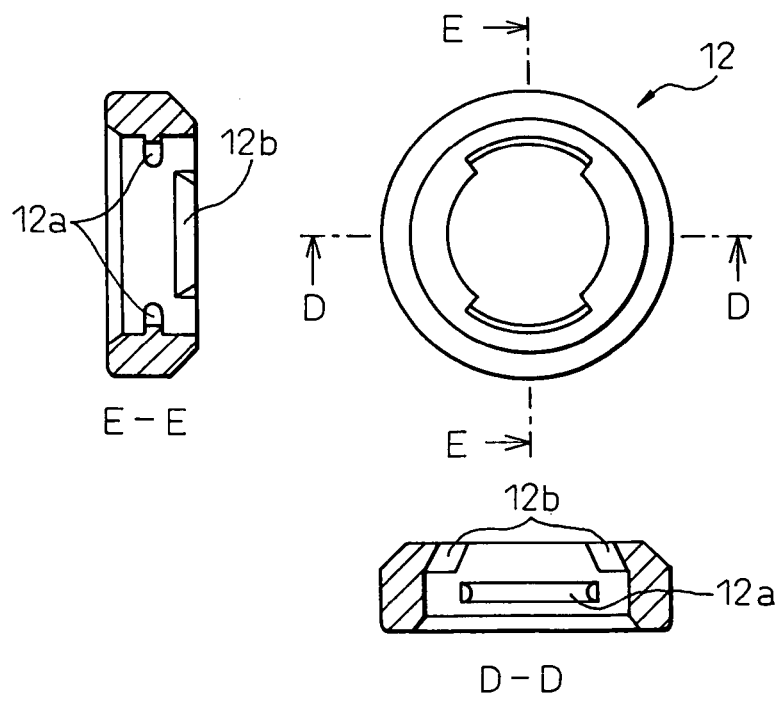
FIG. 6 is a view in which a top view of a cap 12 in FIG. 5, and sectional side views taken along the lines D-D, E-E in the top view.
Figure 7:
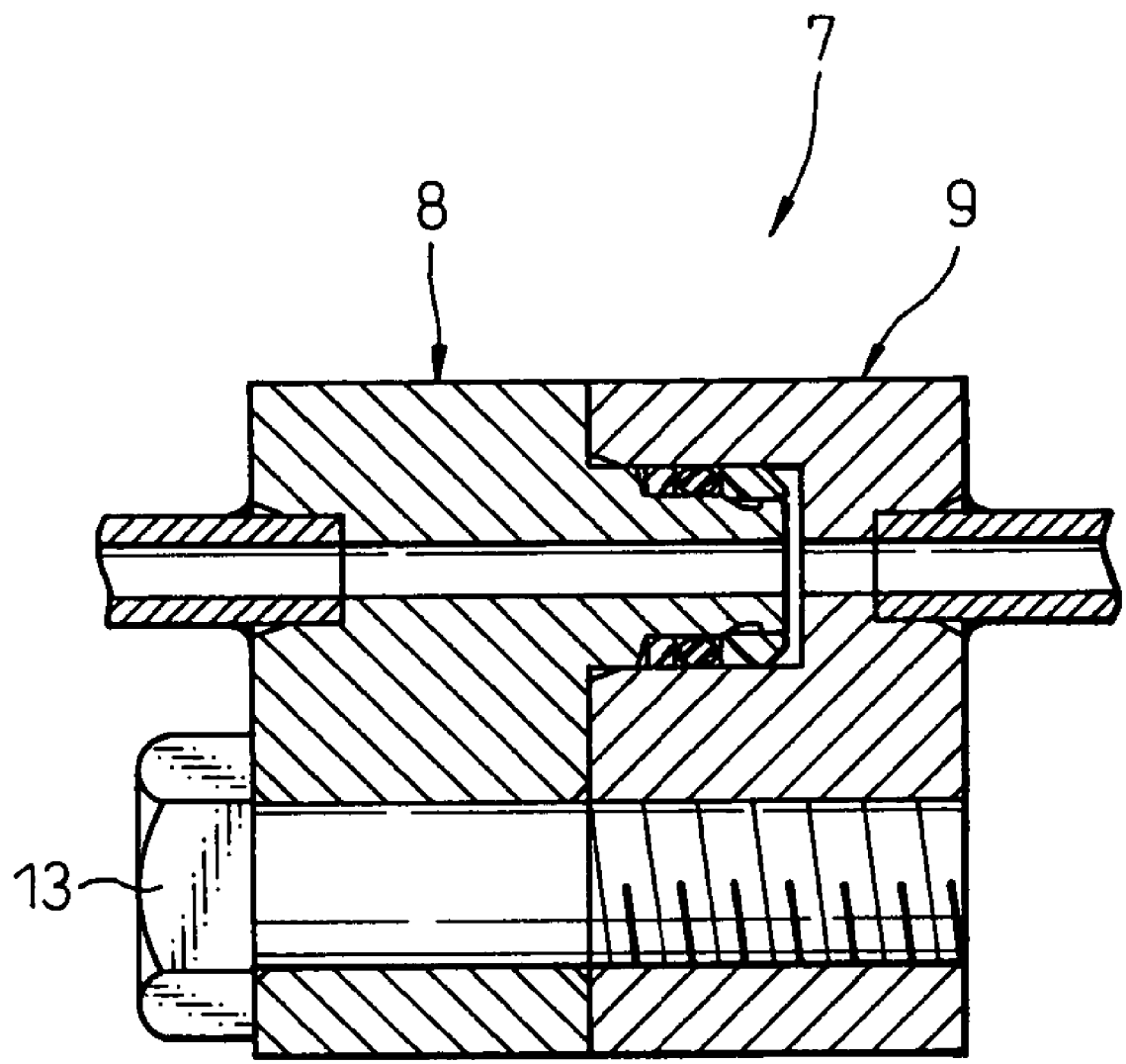
FIG. 7 is a sectional view of a refrigeration cycle pipe joint 7 in FIG. 5, in a joined state.

FIG. 6 is a view in which a top view of the cap 12 in FIG. 5, and side sectional views taken along the lines D-D, E-E in the top view are shown. FIG. 7 is a sectional view of the refrigeration cycle pipe joint 7 in FIG. 5, in a joined state. FIG. 8A is an explanatory side view showing an attaching operation to the male joint portion 8 in FIG. 5. FIG. 8B is a side view of the assembled male joint portion 8. Inwardly projecting stoppers (insertion preventing projections) 12b are provided on the portion of the cap 12, corresponding to the front end of the fitting projection 81 (see FIG. 6). The stoppers 12b are fitted with a chamfered outer peripheral portion of the fitting projection 81, at the front end thereof, to prevent the O-ring 11 from being pressed by the cap 12 due to the pressure of the refrigerant when the cap 12 is attached to the fitting projection 81.

Holding ribs (holding projections) 12a are projected on the inner periphery of the cap 12 (see FIG. 6), and a cap holding groove 81a is provided in the portion of the fitting projection 81, adjacent to the front end thereof (see FIG. 5B). The holding ribs 12a provided on the cap 12 are fitted in the cap holding groove 81a, to hold the cap 12 at a predetermined position of the fitting projection 81. The stoppers 12b and the holding ribs 12a provided on the inner periphery of the cap 12, are split and spaced in the circumferential direction (for example, divided into four), so as not to interfere with each other as viewed in the axial direction of the cap 12.

The cap 12 is secured to the pipe joint not to move during an operation of the refrigeration cycle, and is designed to be detached from the pipe joint by a jig or by hand. In the present embodiment, the holding rib 12a is rounded so that the cap 12 can be detachably attached.

The features of the present embodiment will be described. The cap 12 is adjacent to the O-ring 11 on the side of the front end of the fitting projection 81. The fitting recess 91 of the female joint portion 9, into which the fitting projection 81, the backup ring 10, the O-ring 11 and the cap 12 are inserted, is shaped cylindrically. Accordingly, the attachment of the cap 12 to the front end can prevent the O-ring 11 and the backup ring 10 from being detached. The cap 12 is detachably attached to the fitting projection 81 and, accordingly, the O-ring 11 and the backup ring 10 can be replaced.

The stoppers 12b are provided on the portion of the cap 12, corresponding to the front end of the fitting projection 81. Accordingly, the O-ring 11 can be prevented from being pressed by the cap 12 due to the working pressure of the refrigerant, and from riding on the fitting projection. The cap holding groove 81a is provided in the front end portion of the fitting projection 81, and the holding ribs 12a to be fitted in the cap holding groove 81a, are provided on the inner peripheral surface of the cap 12. Accordingly, in a manner similar to the stoppers 12b, the O-ring 11 can be prevented from being pressed by the cap 12 due to a working pressure of the refrigerant, and riding on the fitting projection, because the holding ribs 12a are fitted in the cap holding groove 8la of the fitting projection 81.

The cap 12 can be held in the predetermined position of the front end portion of the fitting projection 81 and, accordingly, not only the cap 12 but also the O-ring 11 and the backup ring 10 can be more reliably prevented from being detached. The cap 12 is comprised of the stoppers 12b and the holding ribs 12a, which are spaced in the circumferential direction thereof. Therefore, the stoppers 12b and the holding ribs 12a, which are inwardly projected, do not overlap as viewed in the axial direction of the cap 12 and, accordingly, the cap 12 can be easily formed, using molding dies which are opened in the axial direction thereof.

The material of the cap 12 is softer than that of the female joint portion 9. Accordingly, a reduction of the sealing property, due to damage, when the male joint portion 8 is fitted in the female joint portion 9, on a sealing surface of the O-ring inside the fitting recess 91 of the female joint portion 9, can be prevented. The cap 12 is made of an elastomer and, accordingly, is soft and can be easily molded. Thus, a high-volume production can be easily carried out, and the cost can be reduced.

Figure 9:
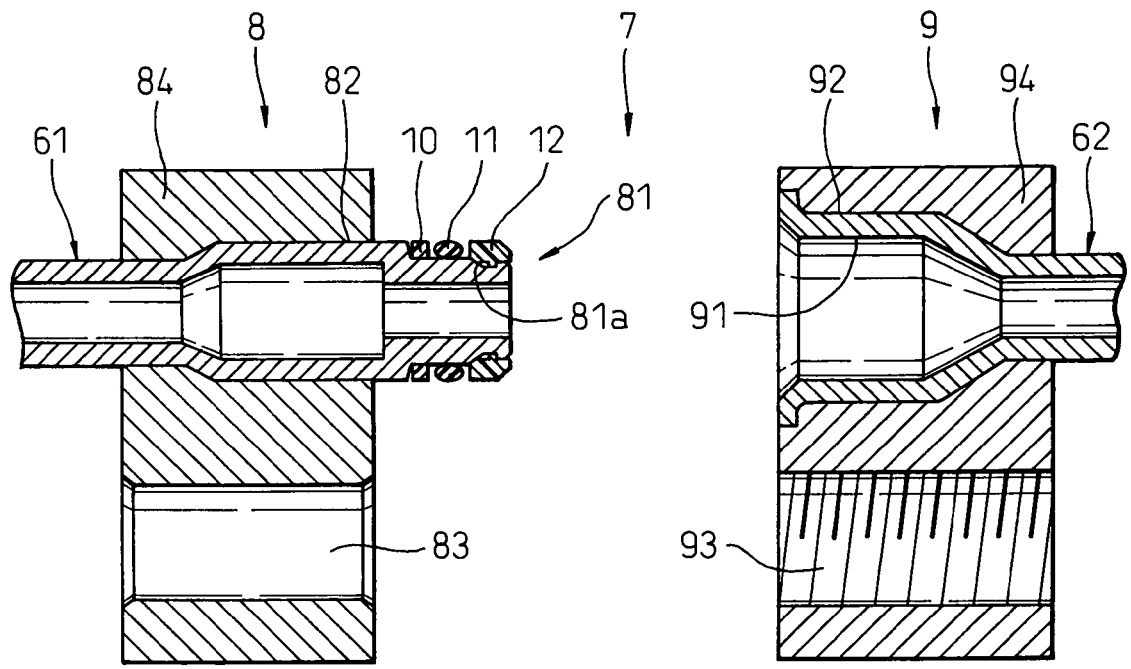
FIG. 9 is a sectional view of a third embodiment of a refrigeration cycle pipe joint 7 according to the present invention.

A third embodiment will be described. FIG. 9 is a sectional view of a third embodiment of the refrigeration cycle pipe joint 7. In the above embodiment, the fitting projection and recess 81, 91 of the pipe joints 8, 9 are formed by cutting, and the refrigerant pipes 6 are brazed to the pipe joints 8, 9, respectively. However, in the present embodiment, a method (a so-called non-brazed joint) in which front ends of the refrigerant pipes 61, 62 are bulged to form the fitting projection and recess 81, 91, and the refrigerant pipes 61, 62 are inserted into pipe insertion holes 82, 92 of bolt securing flanges 84, 94 and, then, are caulked, is shown.

In a conventional pipe joint formed by cutting, the fitting projection and recess are integral with the bolt securing flanges, respectively, and the bolt securing flange is made of a high-strength aluminum, to resist a load caused due to an internal pressure and a bolt fastening force. However, the high-strength material has a poor corrosion resistance and, accordingly, a sealing portion deteriorates due to a corrosion and the sealing property cannot be maintained. However, the non-brazed pipe joint shown in FIG. 9 is a pipe joint having an excellent corrosion resistance because the front end of the pipe joint made of a high corrosion-resistant material is directly formed into the fitting projection or recess.

A pipe joint having excellent corrosion resistance and sealing property can be obtained by applying the structures of the fitting projection and recess according to the present invention, to the non-brazed pipe joint. The front end of the fitting projection 81, which has to be rectangularly bulged in a conventional non-brazed pipe joint, can be substantially linear and, accordingly, can be relatively easily formed. Press-forming or spinning-forming may be used for bulging.

Figure 10:
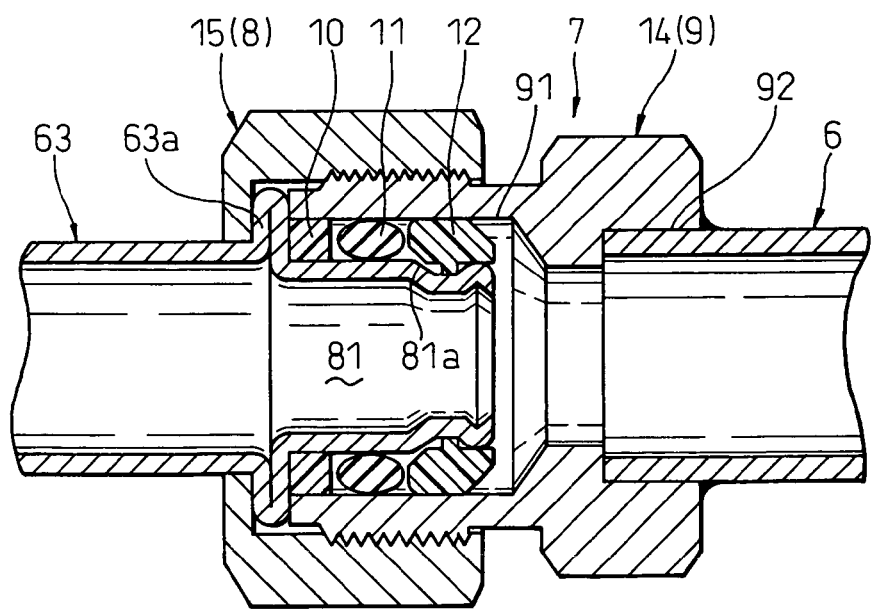
FIG. 10 is a sectional view of a fourth embodiment of a refrigeration cycle pipe joint 7 in a connected state, according to the present invention.

A fourth embodiment will be described. FIG. 10 is a sectional view of a fourth embodiment of the refrigeration cycle pipe joint 10 in a joined testate. While the pipe joint in the above embodiment is fastened by a bolt, the structures of the fitting projection and recess according to the present invention are applied to a half-union type pipe joint. The male joint portion 8 is composed of a cylindrical refrigerant pipe 63 formed by press-forming and a nut 15 for coupling the refrigerant pipe to the female joint portion 9. Here, the nut 15 is made of a material such as aluminum, copper, brass, stainless, iron, etc. In the present embodiment, aluminum A6061 is used.

A flange portion 63a is provided on a predetermined position in the refrigerant pipe 63. The front end portion of the refrigerant pipe from the portion of the flange portion 63a, is the fitting projection 81 to be inserted to the fitting recess 91 of the female joint portion 9. The cap holding groove 81a is formed in the fitting projection 81. The backup ring 10 and the O-ring 11 are fitted on the projection, and are held by the cap 12. In the female joint portion 9, the cylindrical refrigerant pipe 6 are brazed to the union 14. The one end portion (the right side in FIG. 10) of the inner periphery of the union 14 defines a pipe insertion hole 92 in which the refrigeration pipe 6 is brazed. The other end portion (the left side in FIG. 10) of the inner periphery of the union 14, defines a cylindrical hollow portion which communicates with the pipe insertion hole 92 and which is provided with the fitting recess 91 in which the male joint portion 8 is fitted.

As shown in FIG. 10, in the pipe joint 7, the fitting projection 81 of the male joint portion 8 is fitted in the fitting recess 91 of the female joint portion 9, and the nut 15 is fastened with a threaded portion provided on the outer periphery of the fitting recess 91 and, accordingly, the male joint portion 8 is secured to the female joint portion 9. The air-tightness between the fitting projection 81 and the fitting recess 91 is maintained by the O-ring 11 and the backup ring 10.

Finally, another embodiment will be described. In the above embodiment, the shape of the pipe joint according to the present invention is applied to a connecting portion between pipes. However, the present invention is not limited to this. The shape of the pipe joint according to the present invention may be applied to a joint portion between a pipe and a refrigerator device or a joint portion between refrigerator devices (for example, a joint portion between an evaporator and a box-type expansion valve).

While the invention has been described by reference to specific embodiments chosen for purposes of illustration, it should be apparent that numerous modifications could be made thereto by those skilled in the art without departing from the basic concept and scope of the invention.

The invention claimed is:

1. A pipe joint for a refrigeration cycle, comprising:

a male joint portion and a female joint portion, for connecting refrigerant passages of a refrigeration cycle, said male joint portion having a cylindrical fitting projection defining a shoulder and a terminal end, a backup ring directly engaging the female joint portion and the shoulder defined by the cylindrical fitting projection, the entire backup ring being disposed between the shoulder and the terminal end and functioning as a pressure receiving member, and an O-ring separate from the backup ring as a sealing member which directly engages the male and female joint portions, the O-ring being fitted on the fitting projection and the entire O-ring being located between the backup ring and the terminal end of the fitting projection, said female joint portion having a cylindrical fitting recess in which the fitting projection, the entire backup ring and the entire O-ring are fitted, so that when the fitting projection is fitted in the fitting recess, the refrigerant passages are joined, and leakage of a refrigerant to the outside is prevented, wherein an end portion of the fitting projection extending from the shoulder defined by the male joint portion to the terminal end of the fitting projection, has a diameter smaller than the inner diameter of the backup ring;

the backup ring is an endless ring which continuously extends in a circumferential direction;

the material of the backup ring has a lower refrigerant permeability than that of the material of the O-ring;

a cap, which is located adjacent to the O-ring and closer to the terminal end of the fitting projection than the O-ring is provided on the terminal end of the fitting projection; and the female joint portion is provided with a cylindrical fitting recess in which the cylindrical fitting projection, the backup ring, the O-ring and the cap are fitted;

the cap is detachably attached to the fitting projection;

insertion preventing projections are provided on the portion of the cap, corresponding to the terminal end of the fitting projection;

a cap holding groove is provided at the terminal end of the fitting projection;

holding projections to be fitted in the cap holding groove are provided in the inner peripheral surface of the cap;

the insertion preventing projections and the holding projections are spaced in a circumferential direction of the cap; and the material of the cap is softer than that of the male joint portion.

2. A pipe joint for a refrigeration cycle, according to claim 1, wherein
an elastomer is used as a material of the cap.

3. A pipe joint for a refrigeration cycle, according to claim 1, wherein
the fluid passing through the pipe joint is carbon dioxide refrigerant.

4. A pipe joint for a refrigeration cycle, comprising:
a male joint portion and a female joint portion, for connecting refrigerant passages of a refrigeration cycle,
said male joint portion having a cylindrical fitting projection, a backup ring directly engaging the female joint portion and a shoulder defined by the male joint portion and functioning as a pressure receiving member, which is fitted on the fitting projection, and an O-ring, as a sealing member which directly engages the male and female joint portions, which is fitted on the fitting projection and is located adjacent to the backup ring and closer to a front end of the fitting projection than the backup ring,
said female joint portion having a cylindrical fitting recess in which the fitting projection, the backup ring and the O-ring are fitted, so that when the fitting projection is fitted in the fitting recess, the refrigerant passages are joined, and leakage of a refrigerant to the outside is prevented, wherein
an end portion of the fitting projection from the shoulder defined by the male joint portion to the front end, has a diameter smaller than the inner diameter of the backup ring; the backup ring is an endless ring which continuously extends in a circumferential direction; a cap, which is located adjacent to the O-ring and closer to the front end of the fitting projection than the O-ring is provided on the front end of the fitting projection;
the female joint portion is provided with a cylindrical fitting recess in which the fitting projection, the backup ring, the O-ring and the cap are fitted;
the cap is detachably attached to the fitting projection;
insertion preventing projections are provided on the portion of the cap, corresponding to the terminal end of the fitting projection;
a cap holding groove is provided at the front end of the fitting projection; and
holding projections to be fitted in the cap holding groove are provided in the inner peripheral surface of the cap;
the insertion preventing projections and the holding projections are spaced in a circumferential direction of the cap; and
a bolt or a nut to tighten the male joint portion and the female joint portion in an axial direction;
wherein the material of the backup ring has a lower refrigerant permeability than that of the material of the O-ring; and
the material of the cap is softer than that of the male joint portion.

5. A pipe joint for a refrigeration cycle, comprising:
a male joint portion having a cylindrical fitting projection defining a base portion, a terminal end portion and a middle portion extending between the base portion and the terminal end portion, the base portion having a larger outer diameter than the middle portion and the terminal end portion, the terminal end portion having a smaller outer diameter than the middle portion, the base portion and the middle portion defining a shoulder therebetween, and the cylindrical fitting projection providing a refrigerant passage therein;
a female joint portion having a cylindrical fitting recess in which the base portion, the middle portion and the terminal portion are fitted, and the cylindrical fitting recess providing a refrigerant passage therein;
an O-ring made of elastic material being fitted on the middle portion of the cylindrical fitting projection, the O-ring being provided between the cylindrical fitting projection, and the cylindrical fitting recess as a sealing member;
a back-up ring made of material having a lower refrigerant permeability than that of the O-ring, the back-up ring continuously extending in a circumferential direction and defining an inner diameter which is smaller than the outer diameter of the base portion and is larger than the outer diameter of the terminal end portion, the back-up ring being fitted on the middle portion of the cylindrical fitting projection between the shoulder and the O-ring so that the back-up ring functions as a pressure receiving member when the O-ring urges the back-up ring against the shoulder and the cylindrical fitting recess;
a cap having a larger outer diameter than the inner diameter of the O-ring, the cap being detachably attached on the terminal end portion of the cylindrical fitting projection adjacent the O-ring;
a bolt or a nut to tighten the male joint portion and the female joint portion in an axial direction;
insertion preventing projections are provided on the portion of the cap, corresponding to the terminal end of the fitting projection;
a cap holding groove is provided at the terminal end of the fitting projection;
holding projections to be fitted in the cap holding groove are provided in the inner peripheral surface of the cap;
the insertion preventing projections and the holding projections are spaced in a circumferential direction of the cap; and
the material of the cap is softer than that of the male joint portion.

6. The pipe joint for a refrigeration cycle, according to claim 5, wherein the cap is made of material softer than that of the female joint portion defining the cylindrical fitting recess.

7. The pipe joint for a refrigeration cycle, according to claim 6, wherein the cap covers the terminal end portion and defines a chamfered outer edge at a distal end thereof.

8. The pipe joint for a refrigeration cycle, according to claim 5, wherein the insertion preventing portion prevents insertion of the cap beyond the terminal end portion.

* * * * *